Patented Aug. 6, 1935

2,010,595

UNITED STATES PATENT OFFICE 2,010,595

MONO-ALKYL-CHLORO-PHENOLS

Emil Klarmann, Jersey City, N. J., assignor to Lehn & Fink, Inc., Bloomfield, N. J., a corporation of Delaware No Drawing. Application August 29, 1932,
Serial No. 630,784

12 Claims. (Cl. 260—154)

The present invention relates to certain chlorophenols having a single hydrocarbon radical substituted in the ring of the phenol, such compounds having a high bactericidal effectiveness with regard to certain bacteria, and more particularly to such chlorophenol compounds in which the substituting hydrocarbon group has at least 4 carbon atoms. The substituting hydrocarbon radical may be, for example, an alkyl, an arylalkyl radical or other hydrocarbon radical.

Such chlorophenols having a single substituting hydrocarbon radical may be prepared by a number of different methods. In one method suitable for the purpose, an acyl chloride or acyl halide, containing the same number of carbon atoms as the alkyl group which it is desired to substitute in the chlorophenol, is caused to react upon a chlorophenol with the formation of the corresponding ester of the chlorophenol. By suitable means, for example, by treatment with anhydrous aluminum chloride, a rearrangement of the resulting ester is effected with the formation of a chlorophenyl alkyl ketone of a hydrocarbon radical in which the hydrocarbon radical contains one CH₂-group less than the hydrocarbon-substituting group in the final product. The ketone is then reduced, forming the desired mono-hydrocarbon-substituted chlorophenol.

For example, 2-n-butyl-4-chlorophenol may be prepared in the following manner:

85.7 parts by weight of butyryl chloride are added slowly to about 74.5 parts of para-chlorophenol and the mixture allowed to stand for some time, say about 12 hours. It is then heated for a short time on a steam bath, say for about 30 minutes to 1 hour. The excess butyryl chloride is then decomposed by the addition of water and the ester separated by distillation in a vacuum, its boiling point being found to be 96–98° C. at 3 mm. Hg. The separated ester fraction of the distillate, which is 4-chloro-phenyl butyrate, 66.2 parts by weight is then treated with anhydrous aluminum chloride, say about 60 to 61 parts by weight, added in small portions with vigorous stirring and the mixture is then heated to about 150 to 155° C. for a short period, say 30 minutes. Ice and dilute hydrochloric acid are added to decompose the aluminum chloride and the mixture is treated first with ether and then extracted with an aqueous alkaline solution, say about 10%. The ketone thus formed is precipitated by the addition of acid and is purified by distillation in a vacuum. The fraction at about 108–112° C. at 3 mm. pressure, consisting primarily of 5-chloro-2-hydroxy butyrophenone is isolated. It solidifies and is recrystallized from alcohol. It melts at 50.5° C. (approximately).

The chloro-hydroxy-butyrophenone (chloro-hydroxyphenyl propyl ketone) thus prepared is then reduced by any suitable means, for example, with zinc amalgam and hydrochloric acid, forming the desired butyl-chlorophenol. The latter may be taken up in a suitable alkaline alcoholic solution, for example, Claisen's solution, and may be purified, for example, by washing with petroleum ether, precipitation in acid and subsequent distillation. The 2-n-butyl-4-chlorophenol is an oily liquid, which distills at 135–145° C. at 18 mm. Hg.

A phenyl ethyl chlorophenol has also been prepared in a similar manner, by reacting on para-chlorophenol with phenyl-acetyl chloride, thereby forming the phenyl-acetic ester of the chlorophenol. Rearrangement of this compound is effected with formation of hydroxy-chlorophenyl-benzyl-ketone and this, on reduction, yields 5-chloro-2-hydroxy-diphenyl ethane. The latter compound distills at 168° C. at 3 mm. Hg. absolute pressure, and has a phenol coefficient with respect to Staph. Aureus of about 375.

Other methods may be employed for the preparation of compounds according to the present invention. Thus, derivatives with branched side chains may be prepared by a method in which there is a direct condensation of an alcohol or an alkyl or arylalkyl halide with chlorophenols in the presence of a suitable condensing agent, such as sulfuric acid, zinc chloride, ferric chloride, or the like. Another method which has been found available for use is by the introduction of chlorine directly into an alkyl-phenol or arylalkyl-phenol in which the substituting hydrocarbon group has more than 4 carbon atoms, using a suitable chlorinating agent, such as a solution of chlorine in carbon tetrachloride or sulfuryl chloride.

Other compounds containing higher substituting alkyl groups may be prepared in a similar manner by employing initially the acyl halides having the corresponding number of carbon atoms.

The compounds of the present invention are found to have a bactericidal effectiveness with regard to certain bacteria, such as Staphylococcus aureus, markedly higher than lower alkyl chlorophenols, their effectiveness towards bacteria of other types, such as B. typhosus may be rather higher than that of the lower alkyl chlorophenols.

The following examples are illustrative of the present invention:

2-n-butyl-4-chlorophenol, above described;

phenol coefficient with respect to Staph. aureus, 275; to B. typhosus 141.

2-n-amyl-4-chlorophenol; phenol coefficient with respect to Staph. aureus 500. The compound is an oily liquid boiling at 122–123° C. at 3 mm. Hg.

2-sec. amyl-4-chlorophenol; phenol coefficient with respect to Staph. aureus, 312; to B. typhosus, 46.7. The compound is an oily liquid, boiling at 135–140° C. at 3 mm. Hg.

2-n-hexyl-4-chlorophenol; phenol coefficient with respect to Staph. aureus 1250. The compound is an oily liquid boiling at about 132° C. at 3 mm. Hg.

2-n-heptyl-4-chlorophenyl; phenol coefficient with respect to Staph. aureus 1500. The compound is an oily liquid, boiling at 150–152° C. at 3 mm. Hg.

2-sec. octyl-4-chlorophenol; phenol coefficient with respect to Staph. aureus 1000. The compound is an oily liquid, boiling at 155–160° C. at 3 mm. Hg.

4-n-butyl-2-chlorophenol; phenol coefficient with respect to Staph. aureus 93.8. The compound is an oily liquid boiling at 110–115° C. at 3 mm. Hg.

4-tert. amyl-2-chlorophenol; phenol coefficient with respect to Staph. aureus, 125. The compound is an oily liquid boiling at 120–125° C. at 3 mm. Hg.

Other branched-chain compounds, such as the isobutyl, isoamyl, isoheptyl and isohexyl compounds are likewise found to be effective bactericidal agents. Furthermore, by employing meta-chlorophenol in place of para- and ortho-chlorophenols as in the examples previously set forth, the substitution of the alkyl group may be effected in other positions.

I claim:

1. A chlorophenol having a single substituting hydrocarbon radical in the ring, said radical being from the class consisting of the non-cyclic alkyl and aralkyl radicals and having at least 4 carbon atoms.

2. A chlorophenol having a single substituting hydrocarbon radical in the ring, said radical being from the class consisting of the non-cyclic alkyl and aralkyl radicals and having at least 5 carbon atoms.

3. A mono-alkyl-chlorophenol in which the substituting alkyl group has at least 4 carbon atoms, said compound having high bactericidal effectiveness with regard to bacteria such as Staphylococcus aureus or B. typhosus.

4. A mono-alkyl-chloro-phenol in which the substituting alkyl group has at least 5 carbon atoms, said compound having high bactericidal effectiveness with regard to bacteria such as Staphylococcus aureus or B. typhosus.

5. A halogenated alkyl phenol in which the substituting alkyl group has more than 5 carbon atoms, and having the following formula:

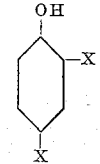

wherein one X is halogen and the other X the substituting alkyl group.

6. A mono-alkyl chlorophenol in which the substituting alkyl group has at least 4 carbon atoms, and in which the substituting alkyl and chlorine groups in the phenol have the 2 and 4 positions.

7. A mono-arylalkyl chlorophenol.

8. A mono-normal alkyl-chlorophenol wherein the substituting normal alkyl group has at least 4 carbon atoms.

9. 2-n-amyl-4-chlorophenol.

10. 2-phenyl ethyl-4-chlorophenol.

11. 2-sec. octyl-4-chlorophenol.

12. The method of forming an alkyl substituted halogenated phenol which comprises subjecting a fatty acid ester of a mono-halogenated phenol to the action of aluminum chloride, thereby rearranging the compound and forming a mono-halogen hydroxy phenyl alkyl ketone and reducing the latter to the desired halogen alkyl phenol.

EMIL KLARMANN.